United States Patent
Novak

(10) Patent No.: US 6,817,136 B2
(45) Date of Patent: Nov. 16, 2004

(54) FISHING POLE HOLDING AND WIND JIGGING DEVICE

(76) Inventor: Scott Novak, 6730-32nd Ave., Kenosha, WI (US) 53142

( * ) Notice: Subject to any disclaimer, the term of this patent is extended or adjusted under 35 U.S.C. 154(b) by 0 days.

(21) Appl. No.: 10/166,219

(22) Filed: Jun. 10, 2002

(65) Prior Publication Data
US 2003/0226308 A1 Dec. 11, 2003

(51) Int. Cl.[7] .......................... A01K 97/10; A01K 87/00
(52) U.S. Cl. .......................................... 43/19.2; 43/21.2
(58) Field of Search ................................ 43/21.2, 19.2; 248/206.5, 309.4; 209/904

(56) References Cited

U.S. PATENT DOCUMENTS

| | | | |
|---|---|---|---|
| 2,122,836 A | * | 7/1938 | Gegerfeldt ................... 43/19.2 |
| 2,499,821 A | * | 3/1950 | Geisheimer ................. 43/21.2 |
| 2,650,052 A | * | 8/1953 | Bintz ........................... 43/19.2 |
| 2,758,407 A | | 8/1956 | Speidell |
| 2,861,378 A | | 11/1958 | Bell |
| 2,934,849 A | | 5/1960 | Kampa |
| 3,001,317 A | | 9/1961 | Boughton |
| 3,074,197 A | | 1/1963 | Schnars |
| 3,126,180 A | * | 3/1964 | Mandolare ................... 43/19.2 |
| 3,599,369 A | * | 8/1971 | Carlson ....................... 43/19.2 |
| 4,033,062 A | | 7/1977 | Denecky |
| 4,373,287 A | | 2/1983 | Grahl |
| 4,463,511 A | | 8/1984 | Copfer |
| 4,567,686 A | | 2/1986 | Akom |
| 4,581,840 A | | 4/1986 | Guith, II |
| 4,642,930 A | | 2/1987 | Graf |
| 4,660,317 A | | 4/1987 | Evans |
| 4,875,654 A | * | 10/1989 | Chandonnet ................ 248/467 |
| 5,056,255 A | | 10/1991 | Campbell |
| 5,119,580 A | | 6/1992 | Schulte et al. |
| 5,231,784 A | * | 8/1993 | Condusta .................... 43/19.2 |
| 5,412,898 A | | 5/1995 | Crain |
| 5,473,835 A | | 12/1995 | Emett |
| 5,540,010 A | | 7/1996 | Aragona |
| 5,570,534 A | | 11/1996 | Ford |
| 5,638,628 A | | 6/1997 | Davis |
| 5,708,874 A | * | 1/1998 | Schrock ....................... 396/174 |
| 5,992,080 A | | 11/1999 | Allen |
| 6,009,656 A | | 1/2000 | Knepp |
| 6,021,596 A | | 2/2000 | Heuke |
| 6,079,142 A | | 6/2000 | Danser et al. |

OTHER PUBLICATIONS

Web site excerpt from www.bridgerstoves.com (printed Dec. 31, 2002).

* cited by examiner

Primary Examiner—Kurt Rowan
(74) Attorney, Agent, or Firm—Jansson, Shupe & Munger, Ltd.

(57) ABSTRACT

Jigging devices for fishing poles are described which provide for easy assembly of the device and easy removal of the fishing pole from the device upon a fish strike. The devices provide for releasable yet reliable connection between the fishing-pole mount and the jigging mechanism and allow communication of movement of the jigging mechanism to be communicated to the fishing-pole mount and, thus, to the fishing line.

20 Claims, 5 Drawing Sheets

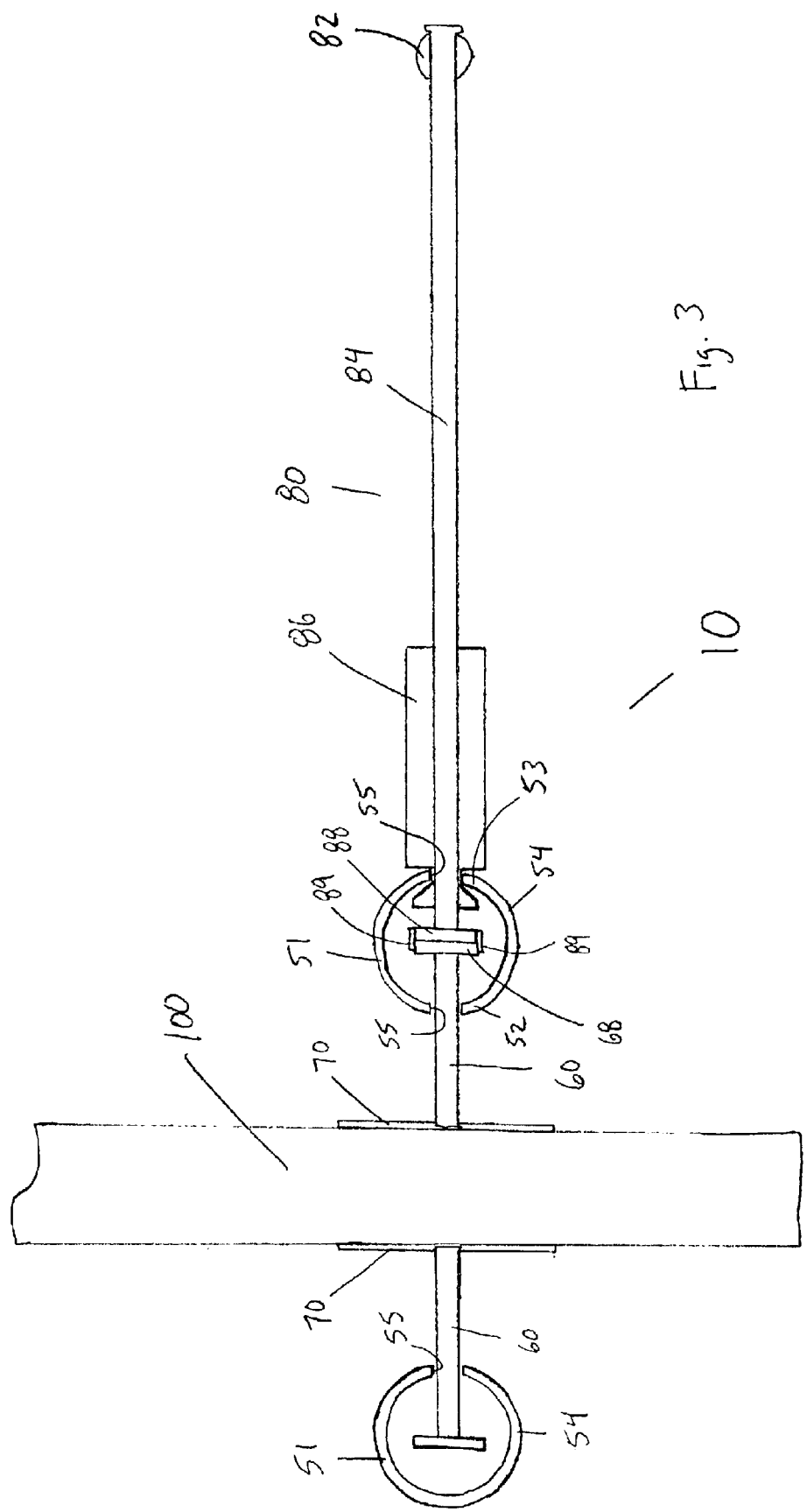

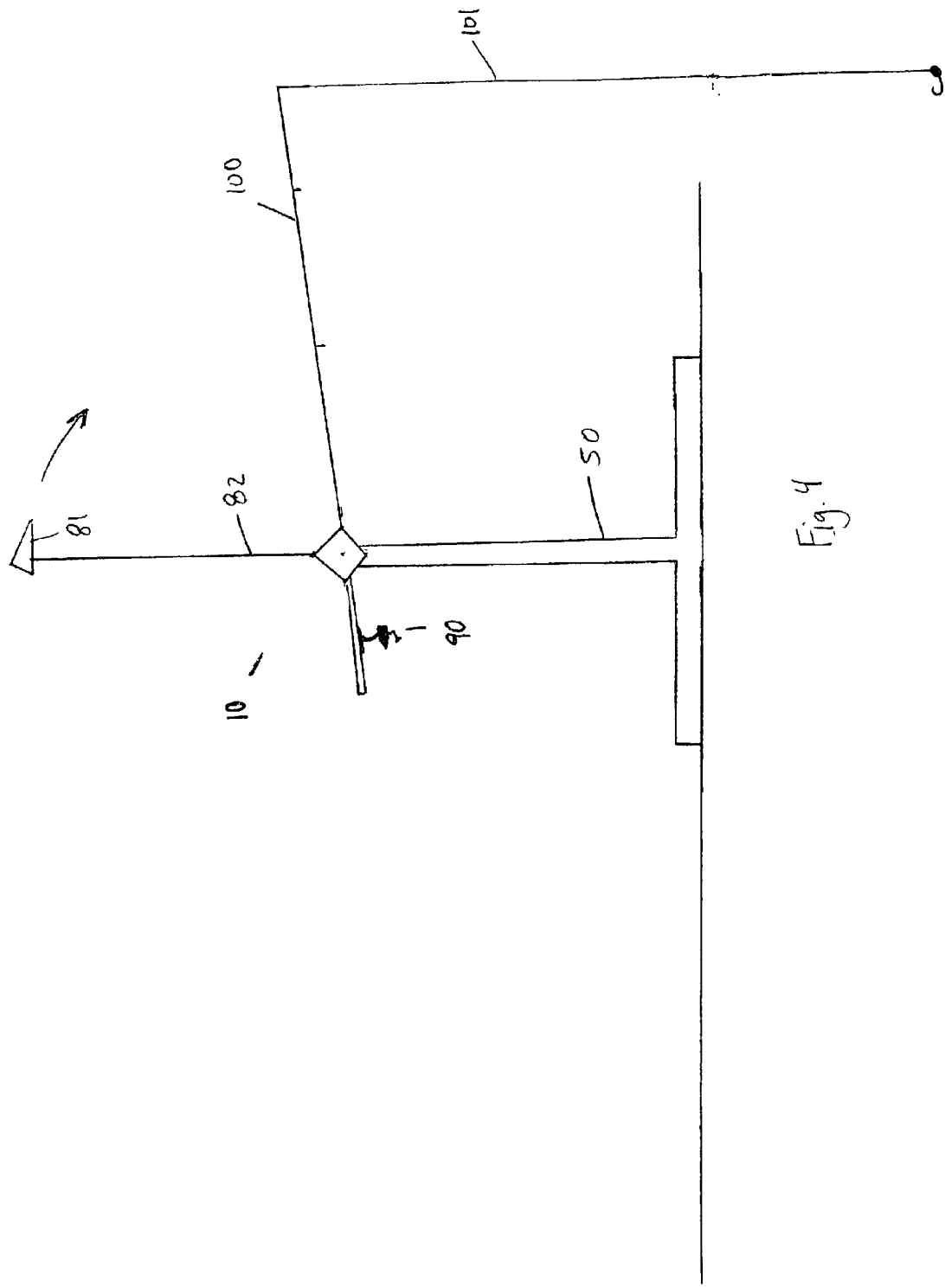

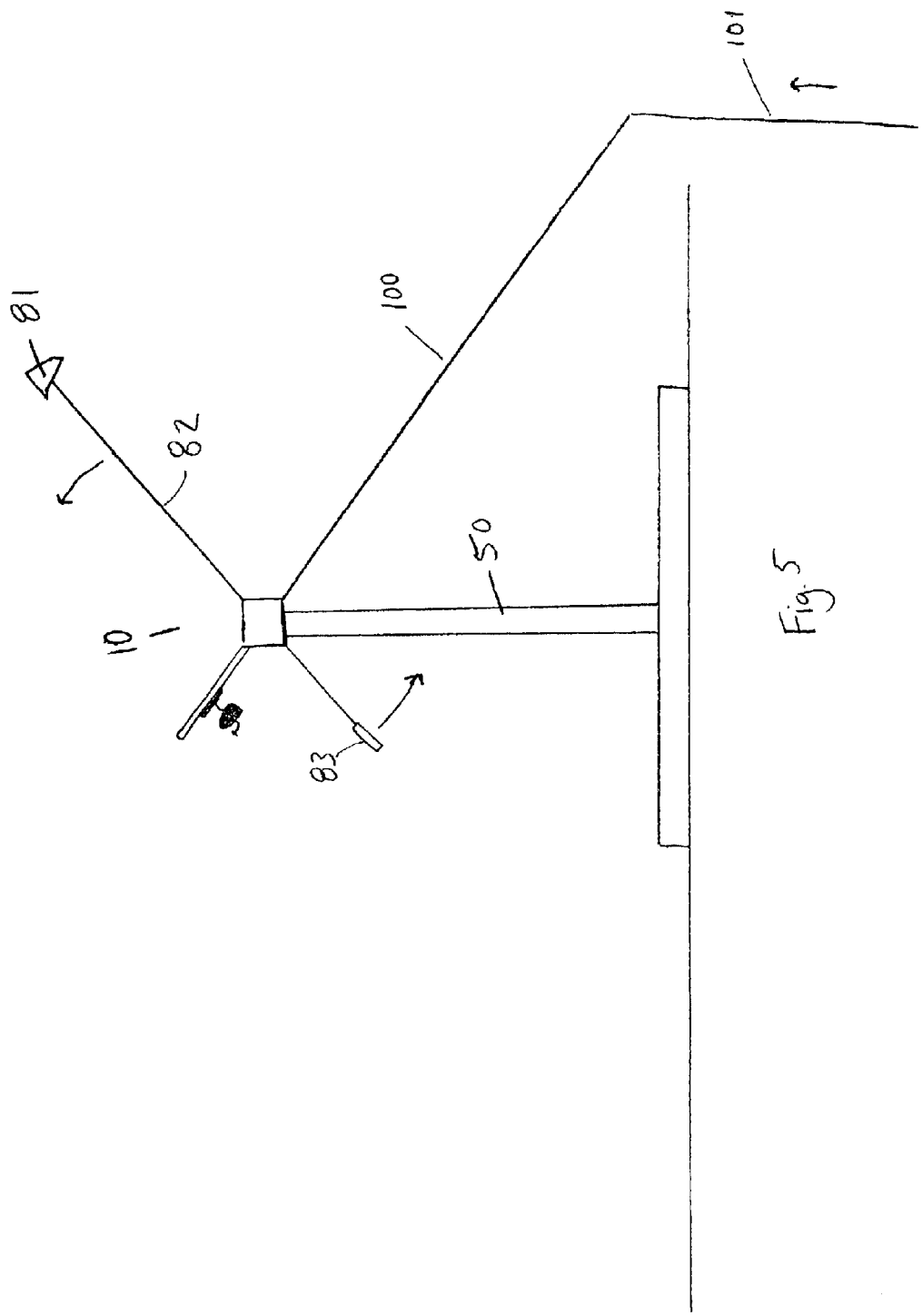

FISHING POLE HOLDING AND WIND JIGGING DEVICE

FIELD OF THE INVENTION

The invention relates generally to supports for holding fishing poles, and, more particularly, to such holders which impart a jigging motion to the pole.

BACKGROUND OF THE INVENTION

One of the most elementary methods for catching fish involves manually causing a baited hook on a fishing line to jig up and down in the water. Movement of the bait attracts the fish which then swallows the baited hook. The fisherman, aware of the fish taking the baited hook by a tug on the line, pulls on the line to set the hook and reel in the fish. This method is particularly useful in ice fishing where fishing is accomplished through a hole in the ice. The fisherman is located directly over the hole in the ice and the vertical jigging of the baited hook is readily effected over the area where the fish are located. However, since the jigging is done manually only one fishing pole may be attended at any one time.

Ice fisherman typically set several poles to increase the probability of landing a fish. However, since only one pole can be attended at any one time, several poles remain stationary and have a decreased chance of catching a fish.

In order to allow a fisherman to fish with more than one pole simultaneously, many devices have been developed for oscillating or jigging a fishing pole to impart a desired movement to the bait or lure. Some devices have been fairly successful, but commonly have disadvantages such as excessive motor, gear and linkage noise, and relatively high initial cost and complexity, the complexity tending to increase the cost of maintenance and sometimes contributing to premature malfunction. Some devices have relatively complex mechanical linkage which is exposed to the harsh marine environment, and thus is prone to corrosion, seizure and premature failure.

In addition to the need for avoiding the complexities of many of the prior art devices which lead to increased costs and maintenance, there remains the need for a jigging device which allows the fisherman to immediately take control of the fishing pole upon a strike without complicated disconnection of the device or the inconvenience of manipulating the pole while it is still attached to the jigging mechanism. Furthermore, there remains the need for a jigging device which allows for the quick re-connection of the pole to the jigging device in case of a false strike, a lost fish or the redeployment of a line after a catch.

In addition to these needs, the fishing community requires such a device to be mechanically simplified and inexpensive, as well as easily transported and easily assembled upon arrival at the fishing site.

An improved holder and jigging device which addresses the problems of jigging devices would be an important advance in the art. The present invention is directed to a wind jigging device which overcomes the disadvantages of the prior art.

OBJECTS OF THE INVENTION

It is an object of the invention to provide a jigging device which overcomes some of the problems and shortcomings of prior art jigging devices.

Another object of the invention is to provide a jigging device which allows for easy transport and assembly.

Another object of the invention is to provide a jigging device which allows for releasable connection between the fishing-pole mount and the jigging mechanism.

Another object of the invention is to provide a jigging device which allows for quick removal of the fishing pole from the jigging device in the event of a fish strike.

Another object of the invention is to provide a jigging device which utilizes magnetic connection between the fishing-pole mount and the jigging mechanism to allow for releasable yet reliable connection therebetween.

Still another object of the invention is to provide a jigging device which can be mounted to a variety of objects such a wheel chair, boat, dock, ice surface or ground.

Yet another object of the invention is to provide a successful jigging device which is simple in design and cost-efficient.

How these and other objects are accomplished will become apparent from the following descriptions and the drawings.

SUMMARY OF THE INVENTION

This invention is an improved holder and wind jigging device for releasably receiving and supporting a fishing pole or rod and imparting a jigging motion to the pole through rotational or pivotal motion between the pole and the device. The invention represents a significant advance over the state of the art by providing novel elements, including a system for releasably supporting the pole within the holder while allowing for the communication of a pivot motion to the pole.

The jigging device can be utilized to move a fishing line to attract fish and comprises a base, an axle rotatably connected with respect to the base, a fishing-pole mount connected with respect to the axle and providing for attachment to a fishing pole which directs the fishing line, and a jigging mechanism connected with respect to the mount. The fishing-pole mount provides for releasable connection between the fishing pole and the base. The jigging mechanism may be releasably connected with respect to the mount and is preferably a wind vane or the like. Such vane can be moved by wind, moving water, or other force.

It is preferable that the axle be releasably connected with respect to the base and that the base include two vertical supports which have notched distal ends to receive the axle. In this preferred embodiment, the axle rests in the notched distal ends and is free to rotate and to be removed by the user.

In a preferred embodiment the device further includes a shaft axially aligned with and releasably and operatively connected to the axle. The shaft is preferably connected with respect to the wind vane or other jigging mechanism to allow movement of the jigging mechanism about the shaft to be translated into rotational movement of the axle. The device may also include a wind-vane brace which is mounted with respect to the base and supports the shaft.

In this preferred embodiment, a magnetic connection between the shaft and the axle is used to allow for releasable and operative connection therebetween. Such a connection can be accomplished when both the shaft and axle include magnetic ends or when at least one of the shaft and axle includes a magnetic end which connects to the other of the shaft and the axle. To ensure proper connection between the shaft and the axle, it is preferred that one of the shaft and axle includes a cupped end portion which supports the end of the other of the shaft and axle. It is most preferred that the magnetic end of the shaft is cupped to ensure proper connection with the axle.

In another version of this preferred embodiment, the shaft and axle may be releasably connected via mechanical systems known in the art. For instance, the ends of the shaft and axle may have corresponding ridges which translate rotational motion from one to the other but allow for release from one another when moved in relative opposite directions, i.e., when the ridges are aligned vertically and the axle is moved vertically while the shaft remains still the ends release one another. Other systems include the connection between two rough surfaces such as sand paper.

In another preferred embodiment, the wind vane has a weighted end to urge the wind vane toward a vertical position. Therefore, whenever the vane is moved out of its normal vertical position the vane automatically resets at the vertical position.

The inventive jigging device can also be described as comprising a fishing-pole mount and a wind vane which are operatively connected through magnetism so that movement of the wind vane causes movement of the mount. Such a device preferably includes an axle connected with respect to the mount and a shaft connected with respect to the wind vane and axially aligned with the axle. At least one of the axle and shaft preferably has a magnetic end to provide magnetic connection to the other of the axle and shaft.

The jigging device preferably further includes a wind foil mounted on the wind vane for catching the wind and turning the wind vane about the shaft to a wind-deflected position so that the shaft and axle rotate and cause the mount to rotate about the axle. The wind vane preferably has a weighted end for moving the wind vane from the wind-deflected position to a non-deflected position and turning the wind vane about the shaft so that the shaft and axle rotate and cause the mount to rotate about the axle. While the wind vane is intended for use with wind, it is known that other forces, such as moving water, may move the vane.

The jigging device preferably includes a base for supporting the axle and shaft. The base preferably includes two vertical supports with notched distal ends which receive the axle. One of the distal ends preferably has and inner side which receives the axle and an outer side which receives the shaft. The outer side preferably has mounted thereto a wind-vane brace for supporting the shaft.

In another description of the invention, the jigging device for moving a fishing line to attract fish comprises a base, a fishing-pole mount rotatably connected with respect to the base and capable of holding a fishing pole which directs the fishing line, and a jigging mechanism connected with respect to the mount.

Each of these descriptions includes reference only to the jigging device. However, the invention can also be described as being the combination of the jigging devices and a fishing pole. In such descriptions, the pole is releasable from the jigging device. Such releasability may be performed between the pole and the mount, between the mount and the axle or, most preferably, between the axle and the base and shaft. The jigging mechanism is preferably releasably attached with respect to the pole in each of these embodiments such that the jigging mechanism stays connected to the jigging device when the pole is removed therefrom.

BRIEF DESCRIPTION OF THE DRAWINGS

FIG. 3 is an overhead cross sectional view of the wind jigging device taken along the axis of the axle and the shaft in accordance with the principles of the present invention.

FIG. 4 is a schematic view of the wind jigging device in the non-deflected position in accordance with the principles of the present invention.

FIG. 5 is a schematic view of the wind jigging device in the deflected position in accordance with the principles of the present invention.

DETAILED DESCRIPTION OF PREFERRED EMBODIMENTS

Figure 1:
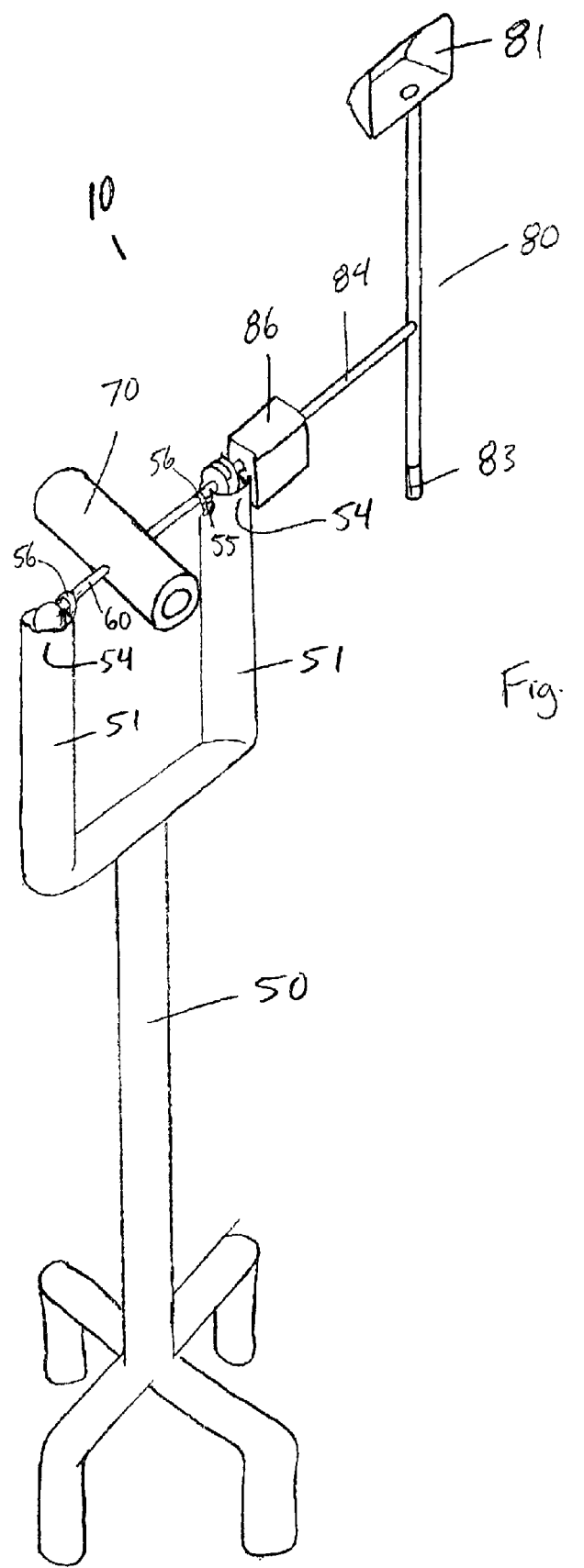
FIG. 1 is a perspective view of the wind jigging device in accordance with the principles of the present invention.

FIG. 1 shows the fishing pole holding and wind jigging device 10 in accordance with the principles of the present invention. Wind jigging device 10 rests on the ground, or on the frozen top layer of a body of water via base 50. As shown base 50 is comprised of four legs, a vertical mast and spaced vertical supports 51 which are positioned above the vertical mast. The components of base 50 are preferably capable of being disassembled for easy transport. In a preferred embodiment, the legs of base 50 are dimensioned such that they can fit inside a standard sized bucket while still connected, thus allowing for easy transport and set-up.

Base 50 may be constructed for use with a wheel chair, or other chair, by providing mounting capabilities with respect to the chair. Base 50 may also be constructed to utilize a ground spike to provide for stronger connection or anchoring to the ground. Base 50 may also be constructed for mounting to a boat or dock as is known in the art. Finally, base 50 may be provided with a container-type portion which may be left empty to allow for floating on a water surface, or may be filled to provide for stronger anchoring on the ground or ice. While such embodiments allow for a wide variety of uses, the vertical supports 51 remain structurally similar to the embodiment shown in FIG. 1 to provide for wind jigging capabilities.

Figure 2:
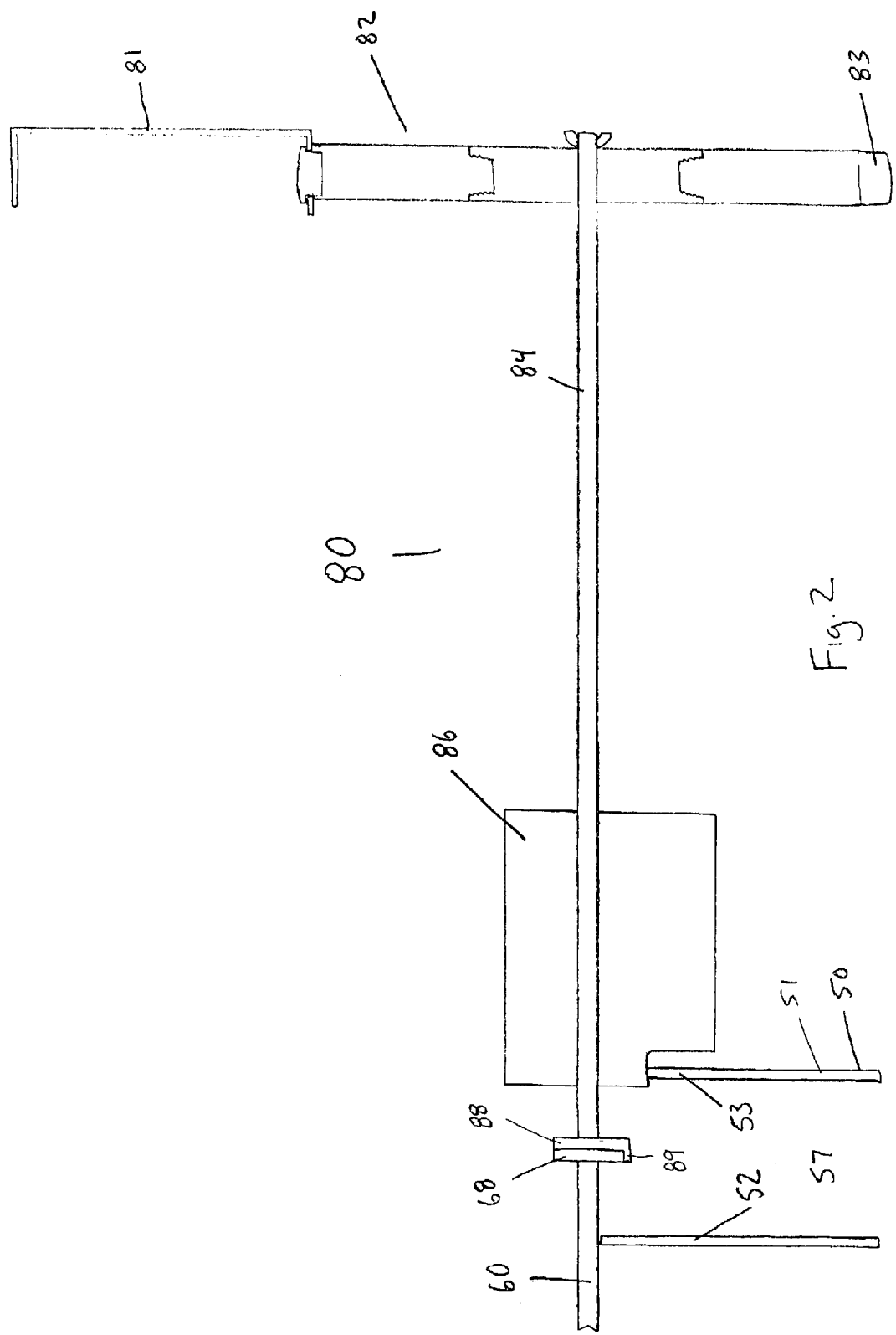
FIG. 2 is a side cross sectional view of the wind jigging device taken along the axis of the axle and shaft in accordance with the principles of the present invention.

Vertical supports 51 terminate upwardly at distal ends 54. Distal ends 54 have notches 55 to provide for connection with axle 60. One of distal ends 54 includes a notch 55 to provide for connection with shaft 84. Axle 60 passes through notches 55 and is free to rotate therein. As shown in FIGS. 1 and 2, vertical supports 51 are tubular and axle ends 68 can rotate within cavity 57. Axle ends 68 are dimensioned such that they cannot pass through notches 55 thus substantially fixing the axial position of axle 60 with respect to base 50. Tabs 56 may be provided to prevent axle 60 from being unintentionally removed from notches 55. Tabs 56 may be of the hook-and-loop type which release quickly when removal of axle 60 from base 50 is desired.

Axle 60 is connected to fishing-pole mount 70 so that mount 70 pivots in response to the rotation of axle 60. Axle 60 and mount 70 may have corresponding threaded portions to allow for connection therebetween. As shown in FIGS. 1 and 3, mount 70 is sleeved around fishing pole 100 such that rotation of axle 60 causes pivoting of pole 100. Base 50 is designed with spaced vertical supports 51 to allow pole 100 to freely pivot almost 360°.

A shaft 84 is provided in alignment with axle 60 such that one axle end 68 is adjacent shaft end 88. It is preferred that shaft end 88 and the adjacent axle end 68 are releasably connected such that rotation of shaft 84 causes rotation of axle 60 while axle 60 can be removed from base 50 without the removal of shaft 84. Such connection can be provide for by forming each end 68, 88 to have corresponding ridges or corresponding roughened surfaces. However, it is most preferred that one of, or both of, ends 68, 88 are magnetic.

Shaft end 88 preferably includes a cupped portion 89 which provides support to axle end 68 to ensure proper connection.

Shaft 84 is a part of jigging mechanism 80 and passes through, and is rotatable within, wind-vane brace 86 which is connected to outer side 53 of vertical support 51. As shown in FIGS. 1, 2 and 3, brace 86 slides into notch 55 along outer side 53 to provide for strong connection between shaft 84 and base 50. Thus, when axle 60 is removed from base 50, shaft 84 remains in position.

Shaft 84 leads to wind vane 82 which is preferably connected thereto via corresponding threads. Wind vane 82 includes several portions which are threaded together to allow for adjustment of length, weight and dimensions of wind vane portions. Wind foil 81 is connected to vane 82 to allow moving air, water or other fluid to provide a rotational force to shaft 84. Weighted end 83 is also provided on vane 82 to provide a force for re-centering vane 82 at its nondeflected vertical position. Weighted end 83 can be provided on the same end of the vane 82 as foil 81 or at the opposite end depending on the preference of the user.

As can be determined from the figures, the wind jigging device 10 allows for a wind force on foil 81 in jigging mechanism 80 to be communicated to fishing-pole mount 70 as a rotational force. At the same time, the device 10 provides for quick and easy removal of fishing pole 100 from the base 50 in case of a strike or bite by a fish. When a user removes pole 100 from base 50, mount 70 and axle 60 remain attached to pole 100. Mount 70 and axle 60 are sufficiently small and light that use of pole 100 is not affected. When the user is done bringing the fish in, or determines that there is no longer a fish on the line 101, he can replace pole 100 on base 50 where axle 60 rests in notches 55 and is immediately reconnected to shaft 84 such that mount 70 is connected to jigging mechanism 80 without further assembly or manipulation. Use of releasable yet reliable connection between axle end 68 and shaft end 88 allows for such performance benefits.

FIGS. 4 and 5 demonstrate the operation of the wind jigging device 10. In FIG. 4, device 10 is shown in the non-deflected position where wind vane 82 is substantially vertical and pole 100 is set at a desired angle to vane 82. The arrow shows the direction of wind which deflects vane 82 into the position shown in FIG. 5. In this position, the end of pole 100 is lowered thus lowering fishing line 101 and providing a jigging movement to the bait at the end of line 101. As the wind dies down such that the re-centering force provided by weighted end 83 is stronger than the wind, vane 82 moves in the direction of the arrows toward the non-deflected position and the fishing line 101 is raised, again jigging the bait.

It should be noted that fishing-pole mount 70 may be designed and provided in a variety of ways but should be positioned near the pole's center of gravity. The center of gravity may be adjusted by moving the reel 90 as is known in the art. For instance, pole 100 may be connected to mount 70 as is convenient, then the position of reel 90 may be adjusted such that the center of gravity is positioned as desired. Pole 100 may be provided at an angle from vane 82 which is close to 90° as is shown in the figures, or it may be positioned at another angle as desired.

The wind jigging device 10 allows a fisherman to provide a desired jigging motion to the fishing line 101 without constantly manipulating the fishing pole 100. This is an especially important benefit for ice fisherman who can rest their arms or keep warm when a fish is not on the fishing line 101. It also provides the ability to fish with many fishing poles at the same time while each pole automatically jigs the fishing line. Thus, it should be apparent that there has been provided, in accordance with the present invention, a holder and wind jigging device for releasably receiving and supporting a fishing pole or rod and imparting a jigging motion to the pole through rotational or pivotal motion between the pole and the device that fully satisfies the objectives and advantages set forth above.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A jigging device for moving a fishing line to attract fish, the device comprising:
   a base including two vertical supports having notched distal ends;
   a fishing-pole mount including an axle and providing for attachment to a fishing pole which directs the fishing line, the fishing-pole mount providing for magnetic releasable connection between the fishing pole and the base, the axle being received by the notched distal ends of the vertical supports and supported by the base;
   a jigging mechanism connected with respect to the mount; and
   a shaft axially aligned with and releasably and operatively connected to the axle, the shaft received by one of the notched distal ends and supported by the base, the shaft connected with respect to the jigging mechanism, thereby allowing movement of the jigging mechanism about the shaft to be translated into rotational movement of the axle.

2. The jigging device of claim 1 wherein the fishing-pole mount includes a sleeve having a cavity for receiving the fishing pole.

3. The jigging device of claim 1 wherein the jigging mechanism is a wind vane.

4. A jigging device for moving a fishing line to attract fish, the device comprising:
   a base;
   a fishing-pole mount including an axle and providing for attachment to a fishing pole which directs the fishing line, the fishing-pole mount providing for magnetic releasable connection between the fishing pole and the base;
   a wind vane connected with respect to the mount, and
   a shaft axially aligned with and releasably and operatively connected to the axle, the shaft connected with respect to the wind vane, thereby allowing movement of the wind vane about the shaft to be translated into rotational movement of the axle.

5. The jigging device of claim 4 further comprising a wind-vane brace mounted with respect to the base and supporting the shaft.

6. The jigging device of claim 4 wherein one of the shaft and the axle includes a magnetic end which connects to the other of the shaft and the axle, thereby allowing for releasable and operative connection.

7. The jigging device of claim 4 wherein the shaft and the axle each have magnetic ends which allow for releasable and operative connection.

8. The jigging device of claim 7 wherein the magnetic end of the shaft is cupped to ensure proper connection with the axle.

9. The jigging device of claim 4 wherein the wind vane has a weighted end to urge the wind vane toward a vertical position.

10. The jigging device of claim 1 wherein the vertical support receiving the shaft has inner and outer sides, the inner side receiving the axle and the outer side receiving the shaft.

11. The jigging device of claim 10 further comprising a brace mounted to the outer side and supporting the shaft.

12. A jigging device for moving a fishing line to attract fish, the device comprising a fishing-pole mount, an axle connected with respect to the mount, a wind vane, and a shaft connected with respect to the wind vane and axially aligned with the axle, and wherein at least one of the axle and shaft has a magnetic end to provide magnetic connection to the other of the axle and shaft, such that operative magnetic connection between the mount and wind vane allows movement of the wind vane to cause movement of the mount.

13. The jigging device of claim 12 further comprising a wind foil mounted on the wind vane, the wind foil for catching the wind and turning the wind vane about the shaft to a wind-deflected position so that the shaft and axle rotate and cause the mount to rotate about the axle.

14. The jigging device of claim 13 wherein the wind vane has a weighted end for moving the wind vane from the wind-deflected position to a non-deflected position thereby turning the wind vane about the shaft so that the shaft and axle rotate and cause the mount to rotate about the axle.

15. The jigging device of claim 12 wherein the wind vane is a jigging mechanism.

16. A jigging device for moving a fishing line to attract fish, the device comprising:

a base;

fishing-pole mounting means for holding a fishing pole which directs the fishing line, the mounting means resting on the base such that the means can be lifted from the base;

a jigging mechanism; and magnetic connection means for releasably connecting the mounting means and the jigging mechanism and for imparting rotational movement of the jigging mechanism to the mounting means;

whereby the mounting means is released from the base and jigging mechanism when a fishing pole held by the mounting means is lifted with respect to the base and jigging mechanism.

17. The jigging mechanism of claim 16 wherein the jigging mechanism includes a shaft and the mounting means includes an axle axially aligned with the shaft during magnetic connection between the mounting means and jigging mechanism.

18. The jigging mechanism of claim 17 wherein the base includes two vertical supports with notched distal ends which receive the axle, one of the notched distal ends receiving the shaft.

19. The jigging device of claim 16 wherein the jigging mechanism is a wind vane.

20. The jigging device of claim 16 wherein the fishing-pole mounting means includes a sleeve having a cavity for receiving the fishing pole.

* * * * *